Figure 3:
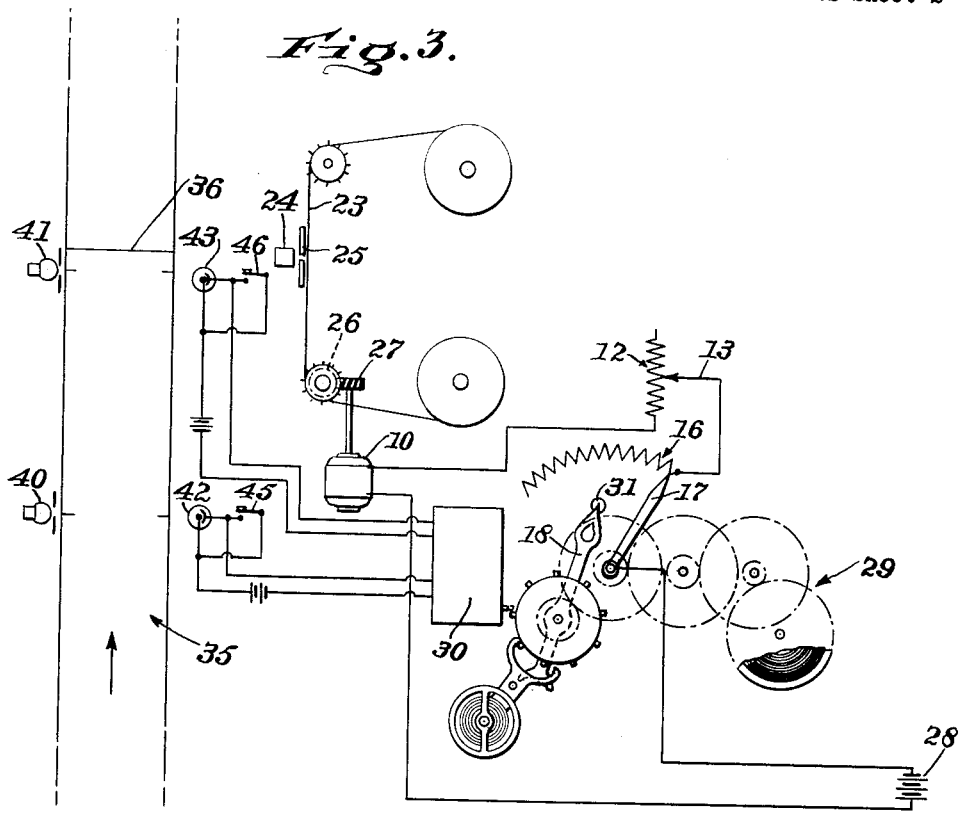

Aug. 24, 1943.   L. DEL RICCIO   2,327,581
MOTOR CONTROL APPARATUS
Filed Aug. 3, 1940    2 Sheets-Sheet 1
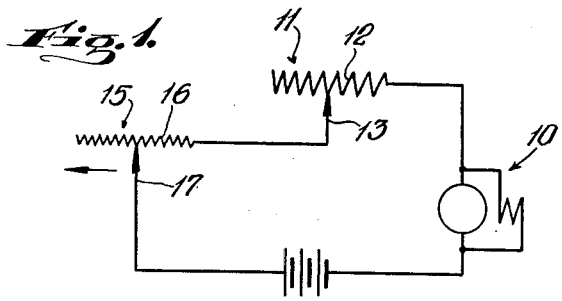
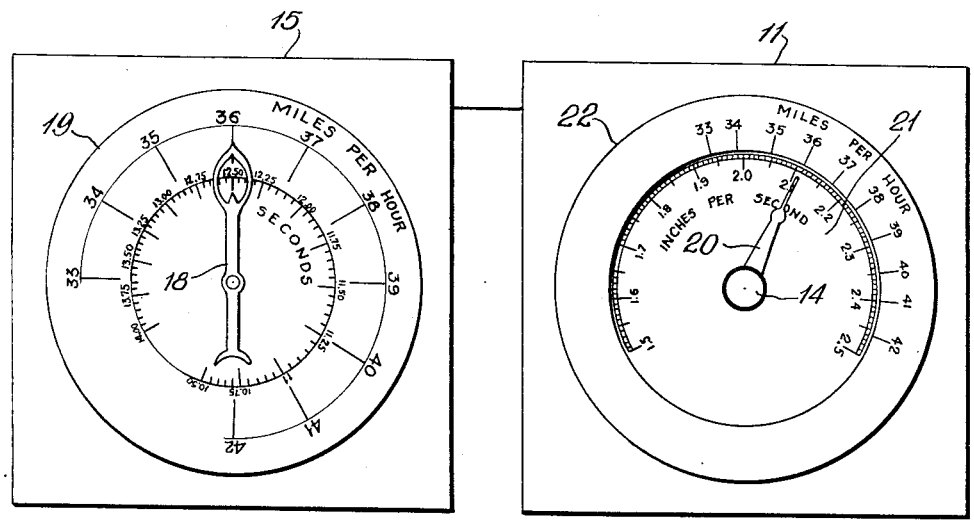
INVENTOR
LORENZO DEL RICCIO
BY
Hornidge and Dowd
ATTORNEYS Aug. 24, 1943.  L. DEL RICCIO  2,327,581
MOTOR CONTROL APPARATUS
Filed Aug. 3, 1940  2 Sheets-Sheet 2

INVENTOR:
LORENZO DEL RICCIO
BY Homidge and Wood
ATTORNEYS

Patented Aug. 24, 1943

2,327,581

UNITED STATES PATENT OFFICE 2,327,581

MOTOR CONTROL APPARATUS

Lorenzo del Riccio, Los Angeles, Calif.

Application August 3, 1940, Serial No. 350,345
In Great Britain August 26, 1939

6 Claims. (Cl. 95—11)

This invention relates to motor speed governing apparatus whereby the speed of an electric motor during the course of its operation may be automatically altered to conform to the speed of a moving object just prior to a given time so as to anticipate it and be in substantial conformity with the speed of said moving object at such given time, and has special application in connection with a camera, such as described in my copending application, Serial No. 262,891, filed March 20, 1939, for photographing a moving object on a continuously moving motor driven film which is exposed through a non-moving slit situated in the focal plane of the camera, the film being continuously moved by an electric motor at a speed related to that of the moving object to be photographed in the optical ratio of the camera, i. e., the ratio between the focal length of the lens and the distance of the lens from the object, or, in other words, at a speed equal to the speed of the image of the object as projected by the lens of the camera upon the film through the slit, the movement of said film and said image being in the same direction and in the opposite direction to that of the object itself.

The object of the invention is to provide a device for regulating the speed of the film to correspond exactly with the speed of the object in the ratio above mentioned so that a sharp and undistorted image of the object is formed upon the film, and for this purpose the said device comprises means for regulating the speed of the motor driving the film conformably with the speed of the moving object just prior to the photographic operation, as determined by the time elapsed while the object travels over a measured distance between two signals, by regulating the amount of resistance in the motor circuit by means of a clock movement which operates a rheostat during the passage of the object over the distance between the two signals.

Other and further objects and advantages of the invention will be apparent from the following description of it as applied to such a camera when used to photograph the finish of a horse race, taken in connection with the accompanying drawings in which Fig. 1 is a diagrammatic representation of the motor circuit including the variable resistance utilized in carrying out the invention, Fig. 2 is a front view of the rheostats incorporating said resistances and showing the dials which indicate and prescribe the proper settings of said rheostats, and Fig. 3 is a diagrammatic arrangement showing the camera set up at the finish line of a race track, the clock driven rheostat controlling the speed of the camera motor, the light beams whose interruption controls the starting and stopping of the clock movement and the clock movement itself.

Referring to the drawings, 10 is the electric motor, preferably shunt wound, for driving the film 23 through the camera, past the lens 24 and slit 25 by means of the sprocket 26 driven by the gear 27 mounted on the shaft of the motor 10, said motor being energized by any suitable source of current such as a storage battery 28. 11 is a rheostat in series with the motor 10 composed of the resistance 12 and the movable contact arm 13 manually rotated by means of the knob 14 to control the value of said resistance. 15 is a clock operated rheostat in series with the motor 10 and the rheostat 11 composed of the resistance 16 and a movable contact arm 17 operated by a clock movement 29 of high time keeping accuracy in a way to progressively increase the value of the resistance 16 with the passage of time, and which clock movement 29 is provided with starting and stopping means 30. The contact arm 17 may also be manually reset at its starting position where the entire resistance 16 is cut out of the motor circuit, the indicator needle 18 being similarly reset to the starting position 31 to conform to the position of arm 17.

The clock rheostat 15 is provided with an indicator needle 18 driven by the clock mechanism 29 and travelling over a dial 19 which is calibrated in seconds and in speed units (miles per hour) based upon the measured distance between the two signals.

The rheostat 11 is provided with an indicator needle 20 whose displacement is governed by the total amount of the resistances 12 and 16, in the circuit as determined by the positions of the contact arms 13 and 17, and is caused to travel by the rotation of the knob 14 over two concentric dials 21 and 22, the dial 21 being fixed and calibrated in terms of the speed of the travelling film, such as inches per second, while the dial 22 is one of a series of interchangeable dials calibrated in terms of the speed of the horses, such as miles per hour, which can be selected to correspond with the ratio of film speed to the speed of the horses to be photographed, i. e. the optical ratio of the camera, as determined by the distance of the camera from the race track and the focal length of the camera lens 24. Thus for a setting of the camera at a distance of 100 feet from the track and the use of a lens having a focal length of 4 inches, the speed of the images of the horses across the slit 25 and the desired similar speed of the film 23 will be 1/300 of the actual speed of the horses.

The values of the resistances 12 and 16 will depend upon the characteristics of the particular motor employed and the extent of speed variation required, all of which can be calculated by methods well known to those skilled in the art. The resistance/speed characteristics of the motor being in general curved, the device is so arranged that the flattest part of the characteristic curve, and only a small part of that, is used for the final speed regulation by the clock rheostat 15. The value of the resistance 12 may be four to six times the value of the resistance 16.

The measured distance used for determining the speed of the horses and regulating the speed of the camera motor is preferably a furlong in length extending along the homestretch of the race track 35 and terminating a small distance short of the finish line 36 upon which the camera is trained. This latter distance need be sufficient merely to assure the response of the motor to the added resistance which has been introduced into the motor circuit while the horses have been travelling over this measured furlong and at the same time not leave room and opportunity for an appreciable change in the speed of the horses between the end of the measured furlong and the finish line. Five to twenty feet is ordinarily sufficient. The beginning and end of this measured furlong are marked preferably by light beams extending across the track 35 from light sources 40 and 41 to photo-electric cells 42 and 43, respectively forming part of a control circuit for the starting and stopping device 30 for the clock rheostat 15, so that when the beam is interrupted by the leading horse in the race as it enters upon the measured furlong, the clock movement of the rheostat 15 is set in operation, and when the light beam at the end of said measured furlong is interrupted by the leading horse the clock movement is stopped, the length of time in seconds and the speed in miles per hour being indicated on the dial 19 of the clock rheostat 15 by the indicator needle 18. The clock control circuit may also be operated by hand controlled switches 45 and 46, by observers stationed at the beginning and end of the measured furlong and watching the horses through suitable sighting devices, or other means may be employed to start and stop the clock at the beginning and end of travel of a horse over the measured furlong.

The method using the apparatus is as follows:

The correct dial 22 calibrated in miles per hour having been selected according to the optical ratio of the camera, for instance, the aforesaid ratio of 1 to 300, and fitted on the fixed dial 21 calibrated in inches per second, the clock is started and allowed to run for a time corresponding to the mean expected speed of the horses over the measured furlong. The running of the clock causes the contact arm 17 to travel in the direction of the arrow thus introducing an increasing amount of the resistance 16 into the motor circuit. After the elapse of this time, say 12½ seconds, the clock is stopped, the speed indicated on the dial 19 being 36 miles per hour. The rheostat 11 is then manually adjusted until the indicator needle 20 indicates the same speed as the needle 18, which in the present example is 36 miles per hour. In accordance with the originally selected values of the resistances 12 and 16 and the calibrations of the dials 19 and 22, such setting of the contact arm 13 with respect to the resistance 12 as determined by the setting of the indicator needle 20 introduces into the circuit a total amount of effective resistance thus provided by the two rheostats to operate the motor at a speed to drive the film past the slit at the same speed of the image of a horse running along the track at a speed of 36 miles per hour. The clock is then reset by turning back the needle 18 and the contact arm 17 to the starting position, and the apparatus is now ready to photograph the finish of the horse race.

As the horses come down the home stretch and enter upon the measured furlong the leading horse interrupts the light beam and, as before stated this starts the clock rheostat 15 and the travel of the contact arm 17 continues until the interruption of the light beam by the leading horse at the end of the measured furlong stops it. It is obvious, therefore, that if the time taken for running the measured furlong is exactly 12½ seconds the same amount of the resistance 16 will be again added to the circuit, so that during that time the motor will be gradually slowed down to the desired speed for photographing the horses as they cross the finish line. If on the other hand the running of the measured furlong takes a longer or a shorter time than the said 12½ seconds, then a greater or less amount respectively of the resistance 16 will be added to the motor circuit and thus at the end of the measured furlong the motor will be running slower or faster in exact accordance with the slower or faster speed of the horses and the speed of the film will bear the same proportion to the speed of the horses photographed as the optical ratio of the camera.

If the optical ratio of the camera, that is the ratio between the focal length and the distance of the camera from the track, were always constant the rheostat 11 could be given a fixed initial setting and never varied, but in order to compensate for small variations in this optical ratio, the resistance 12 is made manually adjustable. It must be understood that large variations must be compensated for by varying the gear ratio of the motor.

It is to be understood that my invention has other applications than to a camera for photographing the finish of a horse race and that I am not to be limited to such an embodiment as herein described, the same being merely illustrative. It is obvious that many changes may be made without departing from the spirit of my invention as defined in the appended claims.

What I claim is:

1. Apparatus for regulating the speed of an electric motor, comprising a manually operable rheostat in series with said motor and a second rheostat in series with the first rheostat, and having a substantially lower resistance value than the first rheostat, a clock movement operatively connected to said second rheostat whereby a selected total resistance in the circuit of said motor may be progressively altered in accordance with the passage of time as defined by said clock movement.

2. Apparatus for regulating the speed of an electric motor to conform with the speed of a moving object which comprises a rheostat in series with said motor, a second rheostat in series with the first rheostat and with said motor and having a substantially lower resistance value, clock means, means controlled by said moving object for rendering said clock means effective and ineffective, said clock means being operatively connected to said second rheostat to operate the same during the movement of said object over a selected distance so as to adjust the total amount resistance in the circuit of said motor.

3. In a camera adapted to photograph a moving object, an electric motor operatively associated with means to cause a sensitive film to travel in the focal plane of the lens of said camera, means for regulating the speed of travel of said film to conform with the speed of a moving object to be photographed, said means comprising a rheostat in series with said motor, a second rheostat in series with the first rheostat and with said motor and having a substantially lower resistance, clock means operatively connected to said second rheostat to progressively alter the effective resistance of said second rheostat in accordance with time intervals defined by said clock means and means controlled by said moving object to start and stop said clock means at the beginning and end, respectively, of travel of said moving object over a selected distance just prior to the photographing operation, thereby to adjust the total amount of resistance in the circuit of said motor.

4. Apparatus for regulating the speed of an electric motor to conform with the speed of a moving object which comprises a rheostat in series with said motor, a second rheostat in series with said first rheostat and with said motor and having a substantially lower resistance value, a clock movement operatively connected to said second rheostat whereby the total resistance in the circuit of said motor may be progressively varied in accordance with the passage of time as defined by said clock movement, and means operated by said moving object for rendering effective and ineffective said clock movement at the beginning and end respectively of travel of said moving object over a selected distance.

5. In a camera of the type wherein a strip of sensitized film is moved continuously past a slit positioned behind a lens for photographing a moving object, and wherein the movement of the film is effected by an electric motor, means for controlling the speed of movement of the film in accordance with the speed of movement of the object to be photographed, said means comprising variable resistance means in series with said motor, time controlled means operatively connected to said variable resistance means to vary the same, switching means operatively associated with said moving object for rendering said time controlled means effective and ineffective to vary the value of said variable resistance means and thereby the speed of said motor.

6. In a camera of the type wherein a strip of sensitized film is moved continuously past a slit positioned behind a lens for photographing a moving object, and wherein the movement of the film is effected by an electric motor, means for controlling the speed of movement of the film in accordance with the speed of movement of the object to be photographed, said means comprising variable resistance means in series with said motor, time controlled means operatively connected to said variable resistance means to vary the same, and switching means comprising light beams in the path of said moving object operatively connected to said time controlled means for rendering the same effective and ineffective to vary the value of the variable resistance means and thereby the speed of said motor.

LORENZO DEL RICCIO.